May 15, 1923.

A. C. ROEBUCK

MOTION PICTURE MACHINE

Filed Nov. 4, 1920

Inventor,
Alvah C. Roebuck
By Nissen & Crane
Attys.

May 15, 1923.
A. C. ROEBUCK
MOTION PICTURE MACHINE
Filed Nov. 4, 1920
1,455,096
4 Sheets-Sheet 2
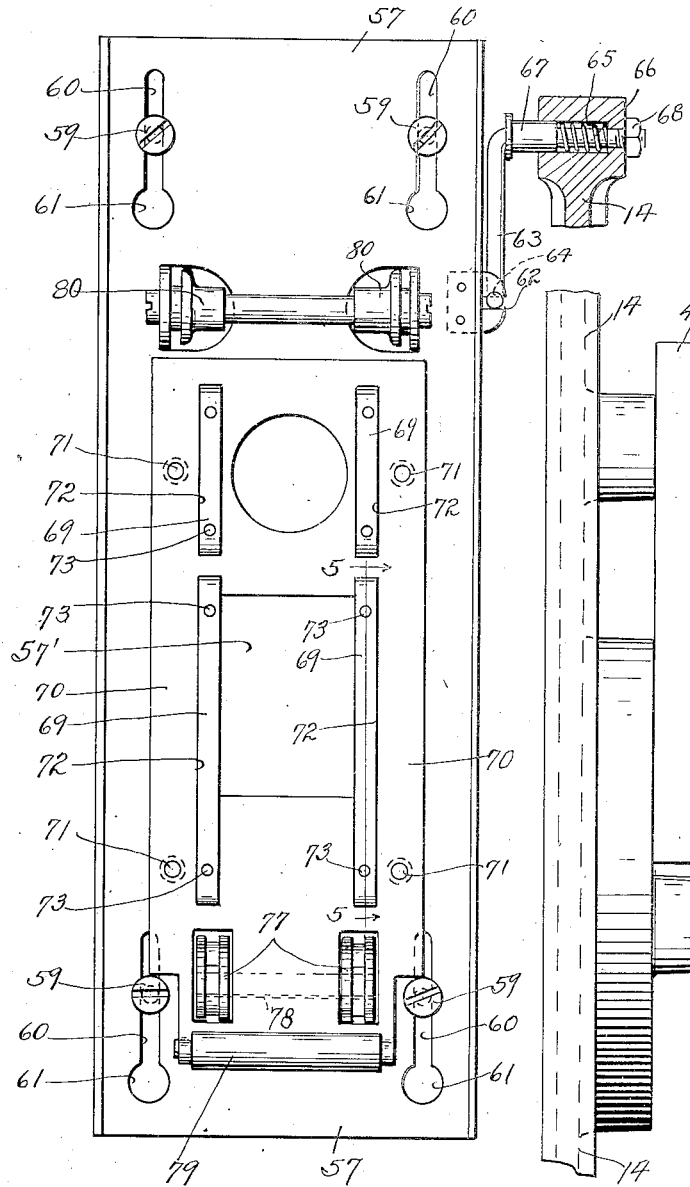
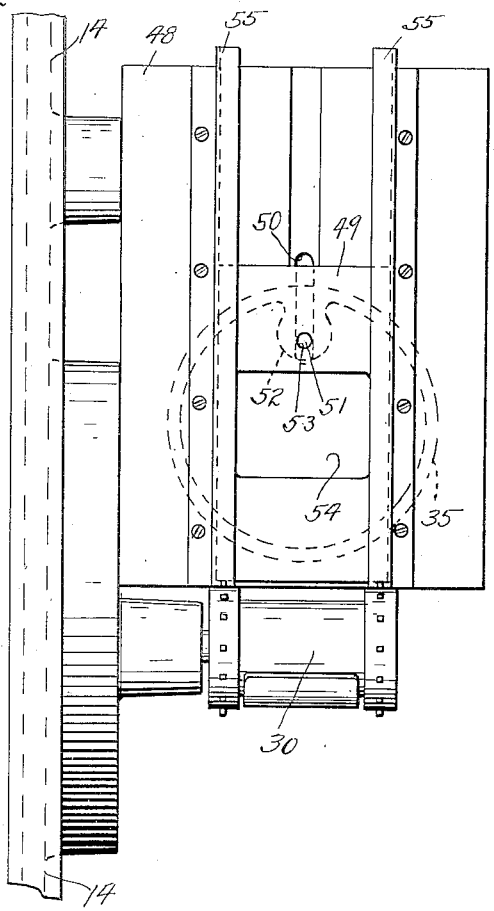
Inventor:
Alvah C. Roebuck
By Nissen & Crane
Attys.

May 15, 1923.
A. C. ROEBUCK
1,455,096
MOTION PICTURE MACHINE
Filed Nov. 4, 1920
4 Sheets-Sheet 3
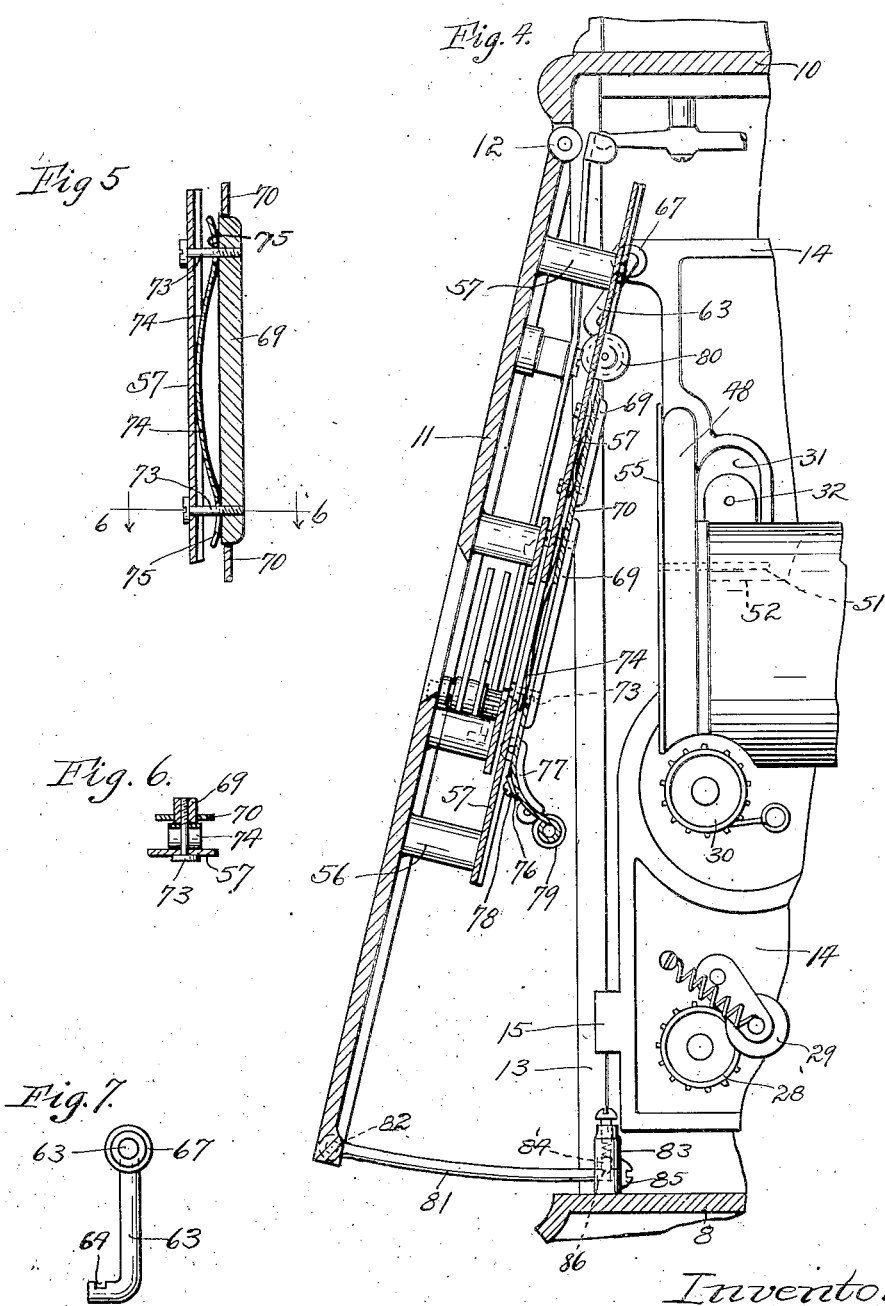

May 15, 1923. 1,455,096
A. C. ROEBUCK
MOTION PICTURE MACHINE
Filed Nov. 4, 1920 4 Sheets-Sheet 4

Inventor;
Alvah C. Roebuck
By Nissen & Crane
Attys

May 15, 1923.

1,455,096

UNITED STATES PATENT OFFICE.

ALVAH C. ROEBUCK, OF CHICAGO, ILLINOIS.

MOTION-PICTURE MACHINE.

Application filed November 4, 1920. Serial No. 421,785.

*To all whom it may concern:*

Be it known that I, ALVAH C. ROEBUCK, a citizen of the United States, residing at Chicago, in the county of Cook and State of Illinois, have invented certain new and useful Improvements in Motion-Picture Machines, of which the following is a specification.

My invention relates to motion picture mechanism and has for one of its objects the provision of a film gate hinged at its top with film shoes mounted thereon so as to produce even pressures on both edges of the film.

Another object is the provision of a film gate for moving picture machines which has its film tension shoes mounted for easy and quick removal and replacing.

A further object is the provision of a film gate having a simple and efficient film tension shoe mounting slidably mounted on a portion of the casing and connected with the film-moving mechanism for movement with the latter.

A still further object is the provision of a film gate with film tension shoes mounted thereon adapted to swing away from the film guide and intermittent sprocket of film-moving mechanism with means for yieldably holding the film gate in different positions away from the film guide and intermittent sprocket.

Other objects will appear hereinafter.

An embodiment of my invention is illustrated in the accompanying drawings, forming a part of this specification, and in which—

Fig. 1 is a side view of a motion picture apparatus with portions of the casing removed to show internal parts;

Figs. 2 and 3 are enlarged views of parts looking from lines 2—2 and 3—3, respectively, in Fig. 1;

Fig. 4 is a fragmental vertical section showing some of the parts in different positions than in Fig. 1;

Fig. 5 is a fragmental section taken on line 5—5 of Fig. 2;

Fig. 6 is a section taken on line 6—6 of Fig. 5;

Fig. 7 is an enlarged detail view of a connecting member used in the construction.

Figure 1:
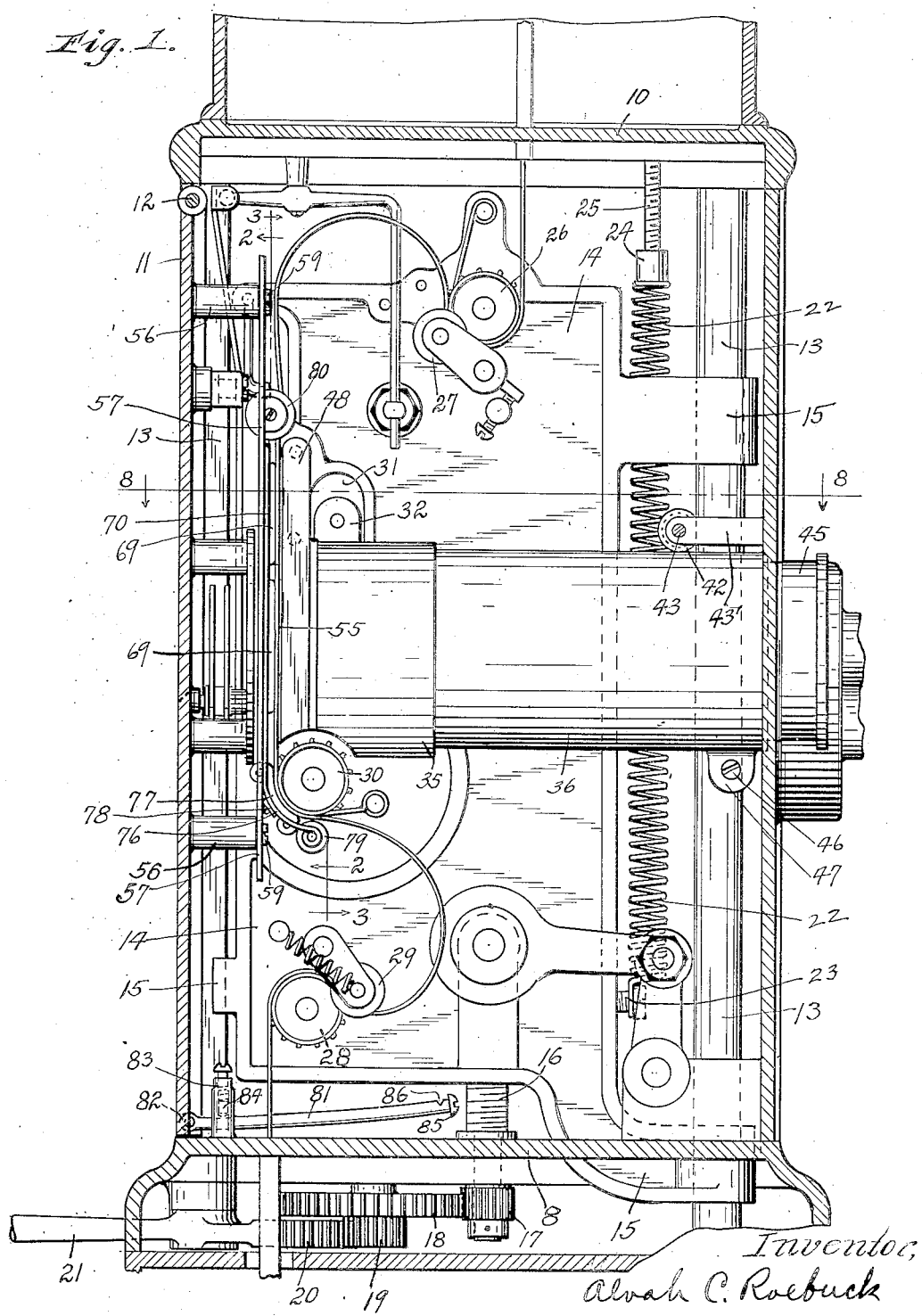
Figure 8:
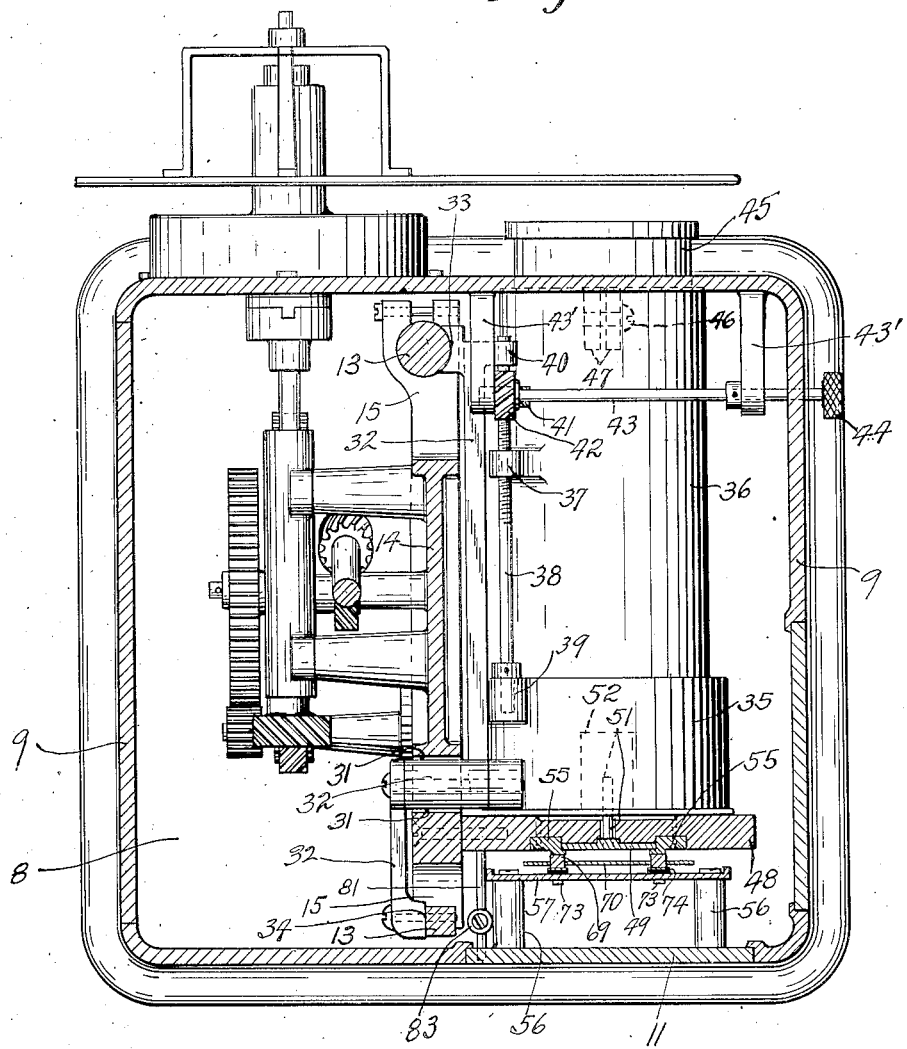
Fig. 8 is a section taken on line 8—8 of Fig. 1.

Referring more particularly to the drawings, I have indicated a fire-proof casing having a base member 8 with side walls 9 extending upwardly therefrom, and a cover 10. At one side of the lower edge of cover 10 is pivoted a door 11 as at 12. The casing may be of any approved construction.

Extending between the base 8 and cover 10 are two upright guides 13, one at the front, and the other at the rear of the casing, and disposed between said guides is a frame 14 having parts 15 engaging said guides. In base 8 is journaled a screw 16 and the latter is threaded in a suitable portion of frame 14 so that rotation of said screw moves the frame vertically on said guides. The screw may be operated in any desirable manner, such as by a pinion 17 on the screw meshing with a gear 18 which has a rigidly attached pinion 19 meshing with a sector gear 20 on a manually operable lever 21.

The frame 14 is partially supported by a spring 22 secured at its lower end as at 23 to said frame and at its upper end to a block 24 threaded on a screw 25 attached to the top 10. The arrangement is such that block 24 can be adjusted on screw 25 to vary the effective strength of spring 22. The strength of spring 22 should be such as to substantially support the frame 14 and parts mounted thereon so that the operator need use only sufficient force on handle 21 to overcome the friction of the moving parts.

Journaled in the upper portion of the frame 14 is the usual upper or feeding sprocket 26 and associated therewith is a retaining roller 27. In the lower portion of the frame is journaled the usual take-up sprocket 28 having its cooperating retaining roller 29. Intermediate the sprockets 26 and 28 is indicated the usual intermittent sprocket 30. It is intended to represent the usual or ordinary sprockets 26, 28 and 30, and these to be operated in any usual or preferred manner, the complete details of the operating mechanism being well known, and hence not shown.

The frame 14 is provided with an opening 31 through which a frame 32 extends. One end of the frame 32 is secured as at 33 to one of guides 13 and the other end secured as at 34 to the other guide 13. The opening 31 is sufficiently long to permit the necessary vertical movements of frame 14 without engaging the portion of frame 32 disposed in said opening.

A light tube 35 is secured to the frame 32 and held rigidly with its axis at the axial center of the light passage through the device. In said light tube 35 is telescoped the end of a lens or objective-holding tube 36, and the latter is provided with an ear 37 threaded on a rod 38. The rod 38 has one end mounted in an ear 39 on light tube 35 and its other end mounted in an ear 40 on frame 32. Fixed on the rod 38 is a spiral gear 41 which meshes with a gear 42 fixed on a manually operable rod 43, and the latter is mounted in suitable bearings 43' on wall 9. The rod 43 has a handle 44 by which said rod is manipulated to move an objective 45 held in tube 36 back and forth to focus the device. The objective 45 may be held in tube 36 by a screw 46 threaded in ears 47 divided by a split in said tube. Any other desirable means for holding and racking the objective 45 may be utilized.

At one end of the tube 35 is a guide plate 48 which is secured to the frame 14 and this guide plate has an opening therein through which the light passes into tube 35. On the side of guide plate 48 opposite tube 35 is an aperture plate 49 and in the plate 48 is an opening 50 through which a rod 51 extends. One end of the rod is fixed in a boss 52 in tube 35 and the other end of said rod 51 is disposed in an opening 53 in aperture plate 49 so that when guide plate 48 moves with frame 14, plate 49 is held stationary with tube 35. The opening 54 in aperture plate 49 if of a sufficient size and shape to define the outline of a picture on the screen and is the masking device of the apparatus. On the front of guide plate 48 and having portions extending over the edges of aperture plate 49 are guides 55 upon which the edges of a film travel across the opening 54.

The door 11 of the casing serves as a film gate for the device and on its inner side has a plurality of bosses 56 upon the inner ends of which is slidably mounted a plate 57. The plate 57 may be mounted in any desirable manner. I have indicated screws 59 passing through slots 60 with enlargements 61 at corresponding ends of said slots to permit the passage of the heads of screws 59 when it is desired to remove plate 57 from the device. To remove said plate from the device it is only necessary to move plate 57 sufficiently high to permit the heads of screws 59 to pass through enlargements 61, this, of course, after the plate has been disconnected from the frame 14.

The plate 57 is connected with the frame 14 so that as the latter is moved vertically for framing a picture over opening 54 the plate 57 will be moved along with said frame. Any desirable connection may be provided for accomplishing this purpose. I have indicated a simple connection which is easly separable. On the plate 57 I have indicated a member having a slot 62 therein in which an end portion of a connecting link 63 is mounted. The connecting link 63 is preferably provided with a notch 64 in its end adjacent plate 57 to help retain the end of said link in the slot 62. The upper end of member 63 is disposed substantially horizontally and extends through an opening 65 in a suitable boss on frame 14. Around said end of the member 63 is a compression spring 66 which tends to push said member, and a collar 67 thereon, toward plate 57 and hold the lower end in slot 62. A nut 68 or other head is formed on the member 63 to limit the movement of said member toward plate 57. To disconnect member 63 from plate 57 it is only necessary to press said member against the influence of spring 66 until the lower end of said link passes out of slot 62 on said plate.

Mounted on said plate 57 are a plurality of film tension shoes 69. These film tension shoes may be mounted in any desirable manner and preferably so that they are yielding. As a simple and efficient mounting for these shoes I have indicated a plate 70 secured as by screws 71 to plate 57. The plate 70 has openings 72 therein of sufficient size to permit the shoes 69 to move easily. Each of the shoes 69 is provided with two screws, pins, or other members 73 which extend through plate 57 with enlargements or heads thereon. The members 73 may be threaded in shoes 69 or attached thereto in any other desirable manner. Between the underside of shoes 69 and plate 57 I provide resilient means, such as leaf springs 74, which normally press the shoes 69 away from plate 57 and said shoes are limited in such movement by the heads of members 73. In the present instance I have indicated the springs 74 as being slotted at their ends as at 75, but any desired shape of openings may be provided or other means for holding these springs in operative positions.

The lower end of plate 70 is curved as at 76 and mounted on said curved portion are curved film tension shoes 77 having their outer surfaces substantially concentric with the periphery of intermittent sprocket 30 when in operative position. The film tension shoes 77 may be mounted in any desirable manner, such as attached to a transverse spring 78, which is attached to the curved portion 76. I preferably provide a roller 79 at the lower end of curved portion 76, but this is not absolutely essential. A film passing through the device is guided by its openings engaging the teeth of sprocket 30 and by a roller 80 mounted above plate 70 on plate 57.

The door 11 is limited in its opening movement by a member 81 pivoted as at 82 to said door. The member 81 passes through or otherwise engages an upright stud 83 on bottom 8 of the casing. In stud 83 is a spring-pressed member 84 which engages member 81 to frictionally hold the door in desired positions. At the free end of member 81 is indicated a head 85 which is adapted to engage member 83 to limit the outward movement of door 11. A notch 86 may be provided adjacent head 85 to engage spring-pressed member 84 to lock the door so that if accidentally struck it would not go shut.

When it is desired to open the device for threading in a film or inspecting the latter, door 11 is opened on its hinge 12, as indicated in Fig. 4. When in such position the film after having been passed between feed sprocket 26 and its roller 27 is passed over guides 55 and across intermittent sprocket 30 and between take-up sprocket 28 and its roller 29. It will be observed that door 11 when in its position shown in Fig. 4 is sufficiently far away from the other parts in the casing to permit inspecting or passing the film between the film tension shoes 69 and the guides 55, and also for passing the film around the intermittent sprocket. As the door 11 is brought shut the film tension shoes 69 having their ends at substantially equal distances from hinge 12 will engage the film at substantially the same time and with even pressures, thereby having no tendency to shift the film from its position on guides 55. As the door closes the film tension shoe 77 will bring the film up in proper place against intermittent sprocket 30.

Should it be desired to entirely remove door 11 the pintles of hinge 12 may be withdrawn and member 63 pressed against the influence of spring 66 to disengage said member 63, when the door 11 can be taken entirely away from the device. It will be observed that when the door is removed the film tension shoes 69 may be easily removed from their mountings, or adjustments of any other parts mounted on said door may be made.

I claim:—

1. Motion picture apparatus comprising a housing; a film-moving mechanism frame slidably mounted in the housing and having a film guide thereon; a door pivoted to the housing on a horizontal axis well above said guide; a plate slidably mounted on said door; film tension shoes yieldably mounted on said plate and adapted to cooperate with said film guide; and an operative connection between said frame and plate.

2. Motion picture apparatus comprising a housing; a film-moving mechanism frame mounted in the housing and having a film guide thereon; a door pivoted to the housing at the top of the latter; cooperating film-guiding parts on the door and said frame, said parts being adapted to separate upon opening said door; a rod pivoted at one end to the bottom of the door and having a notch in its other end; and a spring-pressed stop on the casing adapted to engage said notch and hold the door open and said film guiding parts separated.

3. Motion picture apparatus comprising a housing; a frame in the housing having an opening therein; a light aperture plate slidably mounted in the housing and having a slot therein; a member slidably held in the opening of said frame and having a portion engaging the slot of said plate; and a spring engaging said member and normally holding the latter in said slot.

4. Motion picture apparatus comprising a housing; a frame slidably mounted in the housing film-moving mechanism on said frame; a door pivoted to the housing and having extensions thereon; a film shoe plate having slots therein and disposed on said extensions; headed members passing through said slots and attached to said extensions, there being enlargements at corresponding ends of said slots permitting the plate to be removed from said headed members; spring-pressed film tension shoes mounted on said plate; and a detachable connection between said plate and frame for sliding the plate with said frame.

5. Motion picture apparatus comprising a film gate door; a plate attached to the film gate door; a plate attached to the first-mentioned plate and having openings therein; film tension shoes mounted in said openings; screws passing through the first-mentioned plate and attached to said film tension shoes; and resilient members tending to press the film tension shoes through the openings in the second-mentioned plate.

6. Motion picture apparatus comprising a film gate; a plate attached to said film gate; a member attached to said plate and having openings therein; film tension shoes disposed in said openings; headed pins passing through said plate and attached to said film tension shoes; and sheet material springs having openings in their ends engaging said screws and pressing said film tension shoes away from said plate.

7. Motion picture apparatus comprising a film gate door; a plate attached to the film gate door and having perforations therein; a plate secured to the first-mentioned plate and having openings therein over the perforations in the first-mentioned plate; film tension shoes mounted in the openings of said second-mentioned plate; screws passing through the perforations in the first-mentioned plate and threaded in said film tension shoes; and springs engaging the first-mentioned plate and film tension shoes holding the heads of said screws against the first-mentioned plate.

8. Motion picture apparatus comprising a housing; a frame slidably mounted in the housing film-moving mechanism mounted on the frame and having an intermittent sprocket and a film guideway therein; a door pivoted to said housing; a plate slidably mounted on said door; a member secured to said plate and having its bottom end curved substantially concentrically with the periphery of said intermittent sprocket; curved spring-pressed tension shoes on the curved end of said member adapted to cooperate with said intermittent sprocket; spring-pressed film tension shoes mounted on said plate and adapted to cooperate with said film guide; and means for operatively connecting said plate and said frame.

9. Motion picture apparatus comprising a housing; a frame slidably mounted in the housing film-moving mechanism slidably mounted on said frame; a door pivoted to the top of said housing; a film tension shoe supporting plate slidably mounted on said door and having a slot therein; and a link connected with said frame and having a restricted portion engaging the slot of said plate, said link being yieldable so as to be sprung out of said slot to disengage the plate from said frame.

10. Motion picture apparatus comprising a housing; a light tube fixed in said housing; a film-moving mechanism frame slidably mounted in the housing; a guide plate attached to said film-moving mechanism frame; an aperture plate slidably mounted in said guide plate; an operative connection between said light tube and said aperture plate holding the latter against movements; and spring-pressed film tension shoes adjacent said guide plate.

11. Motion picture apparatus comprising a housing; a film-moving mechanism frame slidably mounted in the housing; a guide plate secured to said frame; an aperture plate at one side of said guide plate; a light tube on the other side of said guide plate; a connection between said light tube and said aperture plate holding the latter against movements with respect to the light tube; and means rigidly supporting said light tube in said housing.

12. Motion picture apparatus comprising a housing; a film-moving mechanism frame slidably mounted in the housing; a guide plate attached to said frame; a light tube rigidly connected with the housing and having a portion disposed substantially against one side of said guide plate; an aperture plate at the other side of said guide plate and connected with said light tube holding said aperture plate against movements while said guide plate is being moved with said frame; guides on said guide plate over said aperture plate; and a film gate having spring-pressed film tension shoes thereon engaging said guides.

13. Motion picture apparatus comprising a housing; a film-moving mechanism frame slidably mounted in the housing; a film gate pivoted on a horizontal axis at the top of the housing; a plate slidably and detachably mounted on said film gate; spring-pressed film tension shoes attached to said plate; a guide plate attached to said frame; a guide attached to said guide plate and engaging said film tension shoes; a light tube rigidly connected with the housing and disposed against one side of said guide plate; an aperture plate at the other side of said guide plate and in said guide; and a connection between said aperture plate and said light tube.

14. Motion picture apparatus comprising a housing; a film-moving mechanism frame slidably mounted in the housing; a door pivoted to and forming a part of said housing; a film tension shoe support slidably mounted on said door; and a connecting link connecting said film tension shoe support to said frame and adapted for easy detachment.

15. Motion picture apparatus comprising a housing; a film-moving mechanism frame slidably mounted in the housing; a door pivoted to and forming a part of said housing; a film tension shoe support slidably mounted on said door; and a link pivoted to said frame and having a detachable connection with said support, said link being yieldably mounted in said frame so as to be easily detachable from said support.

16. Motion picture apparatus comprising a housing having a door hinged at its top edge to the housing and forming a part of the latter, said door also forming a film gate; film tension shoes slidably mounted on the door; a film-moving mechanism frame slidably mounted in the housing; a light tube fixed in the housing; a guide plate attached to said film-moving mechanism frame and slidably mounted with respect to and at one end of the light tube; an aperture plate mounted on said guide plate and having a connection with said light tube for holding said aperture plate in fixed relation in said housing; and guides at the vertical edges of said aperture plate, said door when closed being adapted to hold said film tension shoes against said guides and when open being adapted to space said film tension shoes away from said guides.

17. Motion picture apparatus comprising a housing; a film-moving mechanism frame slidably mounted in the housing and having an opening therein; a plate slidably mounted in the housing and having a notch therein; a rod having one end portion slidably mounted in the opening of said frame and its other end portion engaging said notch; a collar on the rod and extending into said opening; and a compression spring engaging the wall of said opening and said collar normally holding the rod in said notch.

18. Motion picture apparatus comprising a housing; a film-moving mechanism frame slidably mounted in the housing; a light tube fixed in the housing; a guide plate attached to the film-moving mechanism frame adjacent one end of said light tube; an aperture plate mounted on said guide plate; and a connection between the light tube and said aperture plate for holding the latter against movement.

19. Motion picture apparatus comprising a housing; a film-moving mechanism frame slidably mounted in the housing; a light tube fixed in the housing in the light path of said housing; a guide plate attached to the film-moving mechanism frame adjacent one end of said light tube and having a slot therein; an aperture plate mounted on said guide plate with an opening at the light path of said housing; and a pin extending through said slot and connecting said aperture plate with said light tube.

20. Motion picture apparatus comprising a housing; a perforated projection on said housing; a film gate door pivoted on a horizontal axis at its top edge to said housing; a rod pivoted at one end to said door and having a notch adjacent its other end; a stop on said rod at its end adjacent said notch; and a spring-pressed locking member mounted in said projection and adapted to engage the notch in said rod for locking the door in open position.

21. Motion picture apparatus comprising a housing; a film guide mounted in said housing; a door pivoted to the housing on a horizontal axis well above said guide; film tension shoes yieldably mounted on the door and adapted to cooperate with the film guide; and means connected with the housing and door for holding the latter in open position and for holding said film tension shoes away from said guide.

In testimony whereof I have signed my name to this specification on this 27th day of October, A. D. 1920.

ALVAH C. ROEBUCK.